(No Model.) 2 Sheets—Sheet 1.
G. B. WILLIAMSON.
COMBINED THRESHOLD AND WEATHER STRIP.
No. 388,330. Patented Aug. 21, 1888.
FIG I
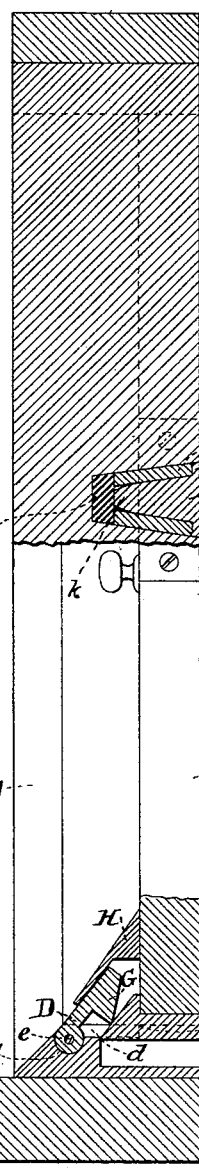
FIG. II.
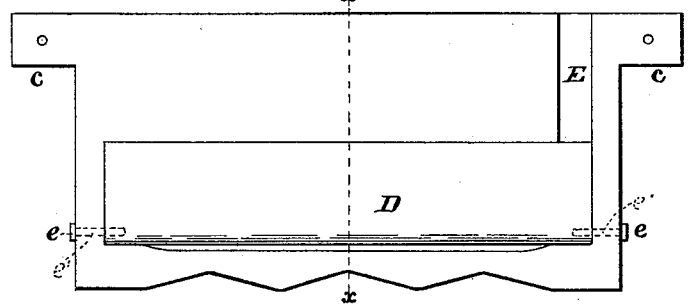
FIG. III.
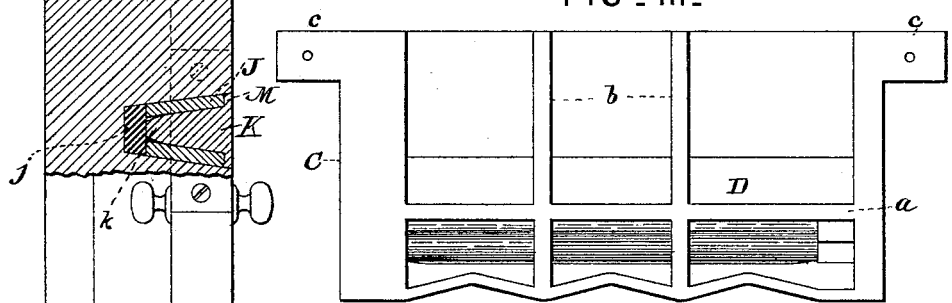
FIG. IV.
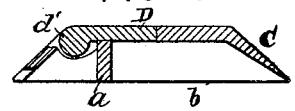
FIG. V.
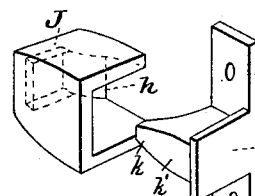
FIG. VII.
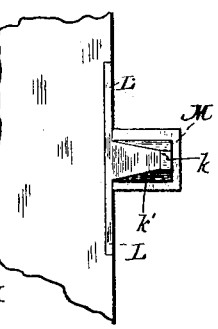
FIG. VI.
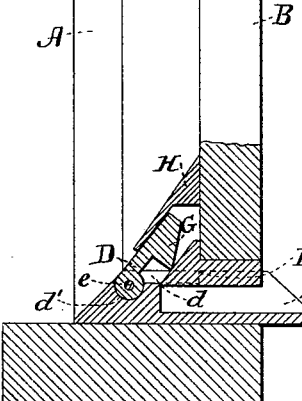
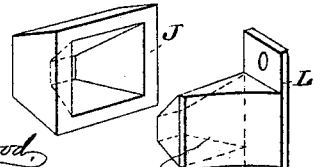
Attest:
Geo. T. Smallwood,
Geo. L. Wheelock.
Inventor
George B. Williamson.
By Knight Bros.
Attys.
N. PETERS, Photo-Lithographer, Washington, D. C.

(No Model.) 2 Sheets—Sheet 2.
G. B. WILLIAMSON.
COMBINED THRESHOLD AND WEATHER STRIP.
No. 388,330. Patented Aug. 21, 1888.
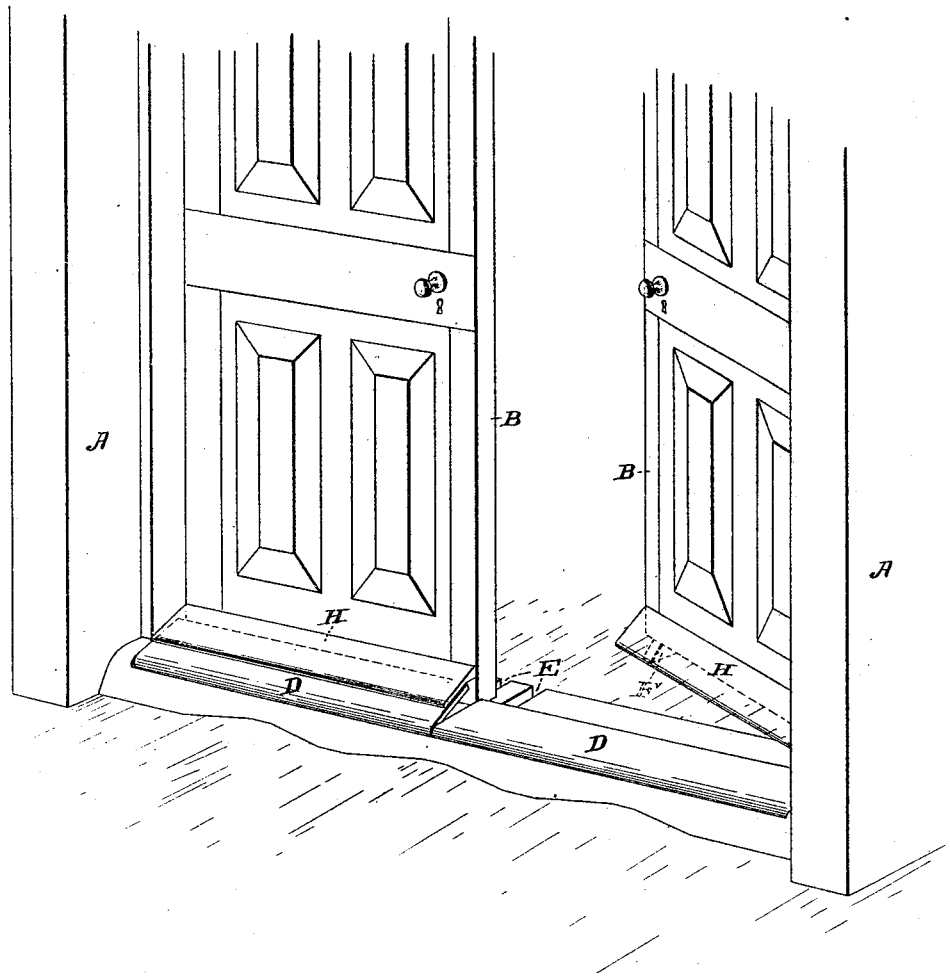
FIG. VIII.
Attest:
Geo. T. Smallwood.
Geo. L. Wheelock.
Inventor,
George B. Williamson.
By Knight Bros.
attys.

United States Patent Office.

GEORGE B. WILLIAMSON, OF BRAIDWOOD, ILLINOIS, ASSIGNOR OF ONE-HALF TO EMILE GRISEZ, OF SAME PLACE.

COMBINED THRESHOLD AND WEATHER STRIP.

SPECIFICATION forming part of Letters Patent No. 388,330, dated August 21, 1888.

Application filed January 20, 1888. Serial No. 261,404. (No model.)

*To all whom it may concern:*

Be it known that I, GEORGE B. WILLIAMSON, a citizen of the United States, residing at Braidwood, in the county of Will and State of Illinois, have invented certained new and useful Improvements in Combined Threshold and Weather Strips, of which the following is a specification.

My invention relates to that class of devices wherein a hinged strip is applied to the threshold of a door, which strip is adapted to be pressed up under a fixed strip on the bottom of the door; and my invention has for its object the exclusion of wind, snow, dust, &c., from the house, which might otherwise find an entrance.

My invention consists in a metallic threshold, which is made hollow to secure lightness, to which is pivoted near its front edge a metallic strip which lies flush with the top of the threshold when the door is open, said strip having at one side a downward projection having an inclined face which is adapted to be engaged when the door is closed by a projection on the bottom of the door, also having an inclined face, the threshold being grooved on its upper surface transversely to permit the engagement. When the door is closed, this pivoted strip is pressed up under an inclined strip (the usual weather-strip) fixed near the bottom of the door, the pivoted strip, front edge of threshold, and the fixed strip being so arranged relatively to each other as that they present a surface on substantially the same incline, thus presenting an extremely neat appearance, pleasing to the eye.

My invention further consists in a block fixed, preferably, to the edge of the door near the lock, said block projecting outward with relation to its face and provided with inclined sides and terminating in a point. This block engages when the door is closed in a metallic socket mortised into the door-frame and having at the bottom a piece of rubber to deaden the noise which might be caused by closing the door.

In order that my invention may be fully understood, I will now proceed to describe the same with reference to the accompanying drawings, in which—

Figure I is a vertical section, parts being broken, the upper part being shown through a door-frame (the door being shown closed) and the lower part through the threshold and partly through the door, showing my improvements. Fig. II is a plan view of the threshold removed from the door-frame. Fig. III is an under side view thereof. Fig. IV is a transverse section taken on the line $x\,x$, Fig. II. Fig. V is a perspective view of the guide piece or block and its socket. Fig. VI is a modification of the same. Fig. VII is a plan view showing a portion of a door, looking toward the point of the guide-piece shown in Fig. V. Fig. VIII is a perspective view showing the invention as used in connection with a double door.

Like letters refer to like parts in all the figures.

Before proceeding with a detailed description of my improvements I desire to state that the threshold and its accessories are preferably of metal, such as iron; but I do not limit myself to any material, as it is evident that wood, &c., could be adopted.

In the drawings, A represents the door-frame, B the door, and C the threshold. The threshold has end projections, $c\,c$, whereby it may be secured by nails or screws to the door-frame. The threshold is hollowed out on its under side, and is provided with strengthening-ribs $a$ and $b$, rib $a$ being longitudinally thereof and ribs $b$ transverse thereof. Rib $a$ is near the forward part of the threshold, and between it and the front of the threshold, which is scalloped or otherwise cut out for lightness, a strip, D, is pivoted. The threshold is cut out at top, as shown at $d$, of sufficient depth to receive the strip D, so that the upper surface of same may lie flush with the upper surface of the threshold, so as to offer no impediment to a person when passing over the threshold. The strip D is provided with pivot-pins $e$, which pass through the sides of the threshold at $e'$, said pivots passing axially through the rounded bearings $d'$ at the front edge of the strip. At the side of the threshold opposite to where the door is hinged is provided a transverse groove, E, extending from the back edge of the threshold to the longitudinal rib $a$. This groove permits the engagement of an inclined faced shoe, F, fixed on the bottom of the door, near its outer edge, with the inclined face of a projection, G, on the lower side of the pivoted strip D, said projection being received in said groove. The engagement of the inclined face of the shoe F with the inclined face of projection G will force the inner edge of the pivoted strip upwardly. When forced up, the upper side of this strip will engage with the under side of an inclined strip, H, fixed near the bottom of and extending entirely across the door, thereby effectually excluding dust, snow, &c., which might otherwise find entrance under the door.

In order that the above devices may always work, which they would not always do unless some special means were provided, as when the door warps or shrinks, I provide a guide-block for bringing the door to position, which guide-block is received, when the door is closed, by a metallic socket, J, which is mortised in the door-frame, it being open on the side toward the door, a small beveled connecting-piece, h, extending across from side to side at the bottom of the opening. The socket is open at the bottom, and between it and the back of the mortise is fitted a piece of rubber, j.

The guide-piece consists of a block, K, having a projection, k, which latter is inclined toward its end on three sides, and on the fourth side it is straight and continuous with the straight side k' of the block. The block is attached to the edge of the door near the lock by means of wings L, and nails or screws passing through them into the door, the wings fitting in a mortise. The block is surrounded by a bead or flange, M, flush with one side of the block and the back of the door, the flange engaging the top of the metallic socket J. As the door shuts, the inclined sides of the guide enter the socket, and the door is raised, lowered, or drawn to its proper position, as the case may be, and the rubber cushion in the bottom of the socket prevents noise. Without this guide-piece the pivoted strip of the threshold would fail to connect with the working devices when the door has warped.

A modification of the guide-piece and socket is shown in Fig. VI, in which the socket is shown in the form of a hollow frustum of a pyramid, and the projecting piece is shown in the form of a pyramid.

In Fig. VIII, I have shown the improvement as used in connection with double doors, the guide-piece and socket being omitted. The parts are simply duplicated, the threshold for each door being in one piece. The pivoting of the strip within the threshold, so that it does not, when down, project above the threshold, renders the improvement particularly applicable to double doors.

I may use the guide piece and socket in that class of double doors where usually only one is in use, the other being usually fastened shut—e. g., common double store-doors, On such doors the method of attachment is the same as on single doors, except of course that the socket is sunk into the inner face and edge of the stationary door instead of into the door-casing.

Having thus described my invention, the following is what I claim as new therein and desire to secure by Letters Patent:

1. In combination with a door having a strip, H, secured near its base, and an inclined faced shoe, F, at its bottom edge, a threshold made in one piece, having a longitudinal recess in its upper side, a strip, D, having an inclined projection on the bottom side, wherewith the said shoe engages, and pivot-pins e, secured in each end of the strip D and passing through the ends of the threshold, said strip D occupying said recess, whereby its upper side is adapted to lie flush with the upper side of the threshold, all substantially as shown and described.

2. A hollow threshold having a recess in its top opening into the hollowed portion, a longitudinal rib between the sides of the recess, transverse ribs, and a strip pivoted in said recess and resting upon the ribs, substantially as set forth.

3. A hollow threshold having a longitudinal rib, a, near its front edge, a strip having a rounded edge bearing between said rib and the front of the threshold and rounded bearings in the latter, in combination with the door having a strip near its base under which said strip is adapted to fit, substantially as set forth.

4. In combination with a strip pivoted to the threshold of a door, the door having an inclined strip secured near its base, means for forcing the strip of the threshold into the recess behind the strip of the door, and a guide on the door adapted to fit in a socket in the door-frame, substantially as and for the purpose set forth.

5. In combination with a strip pivoted to the threshold of a door, the door having an inclined strip secured near its base, means for forcing the strip of the threshold into the recess behind the strip of the door, a guide-piece on the door having inclined sides, and a socket in the door-frame complementary thereto, substantially as and for the purpose set forth.

GEORGE B. WILLIAMSON.

Witnesses:
E. W. FELTON,
JAMES McARTHUR.